Feb. 7, 1956

J. Z. MENARD 2,734,033

MAGNETIC RECORDING MEDIUM

Filed Oct. 8, 1949

INVENTOR
J. Z. MENARD
BY
G. H. Heydt
ATTORNEY

United States Patent Office 2,734,033

Patented Feb. 7, 1956

2,734,033

MAGNETIC RECORDING MEDIUM

James Z. Menard, Summit, N. J., assignor to Bell Telephone Laboratories, Incorporated, New York, N. Y., a corporation of New York Application October 8, 1949, Serial No. 120,396

1 Claim. (Cl. 252—62.5)

This invention relates to magnetic recording media.

For those applications where the message must be changed frequently, magnetic recorders are a logical solution. There are a number of commercial applications for magnetic recording which require continuous repetition of messages between 5 and 30 seconds in length. Some of these applications are for weather announcements, various intercept services, toll circuit delay quotations, and service quotations such as in the airline offices and in stock exchanges.

For such uses it is desirable that the recorder have acceptable transmission characteristics and particularly that it require little maintenance and give long life. It is possible to realize acceptable transmission performance from several existing types of magnetic media but it is much more difficult to achieve the life and reliability desired for these types of service. Magnetic recording systems with practically indefinite life can be built by operating with the heads physically separated from the medium by a small air-gap. However, separation between heads and medium causes loss of signal and band width, and for the separations which can be used in a realizable system, it is necessary to increase the speed of the medium by an appreciable factor to compensate for these losses. This increases the required amount of recording medium to such an extent that it is not practicable to construct out-of-contact recorders for the message length desired in these services. Therefore, it is virtually necessary to operate with the heads in contact with the recording media.

A loop of vicalloy steel tape has been used for several years in systems such as those employed for weather announcements. While these systems have given satisfactory results, the procurement of vicalloy tape does present some difficulties. Experience with loop-type magnetic recorder-reproducers has indicated that most failures are due to physical failure of the tape as a result of the continuous tension, flexion, and abrasion it undergoes. In machines using paper or plastic tapes, the tapes have failed physically before the coatings showed serious deterioration, but it is probable that the life of the coating, which is about 0.0005 inch thick in commercial tapes, would become a limitation if appreciable improvement were realized in the physical life of the paper or plastic backing.

This experience has suggested the desirability of placing the medium on the surface of a cylinder which is rotated under the recording heads, using a spiraling arrangement or a head switching arrangement to increase the track length in those applications where the cylinder circumference is insufficient to give the necessary recording time. With such an arrangement the medium would not be manipulated and, in those applications where it is necessary to operate with the recording head in contact with the recording medium, it would be stressed only in compression by the weight of the recording head. Physical failure would be virtually eliminated and the life of the medium should be limited primarily by the wear occurring between the medium and the recording head.

Two classes of material have appeared promising as magnetic media for use on cylinders. These are magnetic platings and powdered magnetic coatings. Magnetic sufaces have been produced on cylinders by a superposed alternating current-direct current electroplating process. Such a coating does not easily deteriorate, and gives a high signal output. However, it is vitally important to maintain consistent intimate contact between the recording heads and recording medium because any separation decreases the signal output and deteriorates the frequency response. As an example, separation of one wavelength between head and medium causes approximately 55 decibels loss in output at that frequency. With the plated media it is difficult to maintain the desired intimacy of contact because neither the heads nor the media can yield appreciably to conform to slight irregularities in the contacting surfaces of the head and medium, or to accommodate inaccuracies in the mechanical system.

Experience has shown that a metallic head riding on a plated surface may under some conditions decrease the life of the recording medium to an undesirable degree. Moreover, the frequency response and signal-to-noise ratio of the plated media are usually poorer than the frequency response and signal-to-noise ratio of the powdered media.

The powdered magnetic recording media are relatively new, but have achieved wide usage in the form of coated tapes. They offer certain advantages over the plated media with regard to improved frequency response, better signal-to-noise ratio, and economy and ease of production. Some work has been reported on the use of powdered magnetic coatings on cylinders for pulse storage calculators, but these have been used at high speed with the recording heads out of contact, and they accommodate only a short recording time. To obtain recording times of the length required for the applications in which the present invention is to be employed, it is necessary to operate with the recording head in contact with the recording medium. Therefore, it is desirable to provide a powdered recording medium in such form that it will wear well, and possess enough resiliency to accommodate contact irregularities thereby maintaining intimate contact between the heads and the medium, and to cushion the heads against chatter.

Accordingly, it is an object of the present invention to provide a new and improved magnetic recording medium which will possess the properties enumerated above.

It has been discovered that a recording medium comprising a cured rubber and finely divided or powdered ferromagnetic material will satisfactorily meet the requirements for contact wear, resiliency, cushioning of the contacting recording head against chatter, permanency of recording, frequency response, signal-to-noise ratio, and economy and ease of production. This medium may be molded in tire form and then slipped onto and affixed to the surface of a recording cylinder, or, it may be applied directly to the recording cylinder by spraying or dipping. The recording medium is cured or vulcanized in any manner known to the art before it is employed in the recorder-producer system.

The invention itself, together with further objects and advantages thereof, may best be understood by reference to the following description taken in connection with the accompanying drawings in which.

Figure 1:
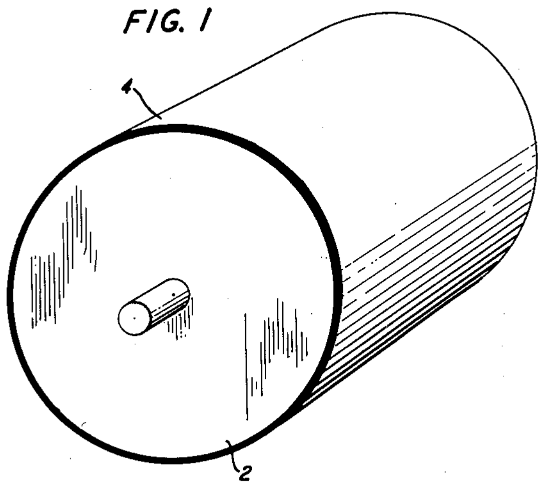
Fig. 1 is a perspective of the recording cylinder with the recording medium affixed to the surface thereof.
Figure 2:
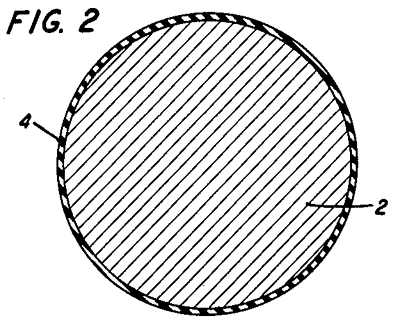
Fig. 2 is a cross-section of the cylinder and medium shown in Fig. 1.

As shown in Figs. 1 and 2, the recording medium 4 is affixed to the recording cylinder 2 in such manner as to provide a surface upon which a magnetic recording head may ride smoothly and with continuous intimate contact during the recording or reproducing process. The recording cylinder 2 may be of any non-magnetic material such as aluminum. The recording medium 4 comprises a rubber and a finely divided ferromagnetic material which have been intimately mixed as by milling. Any synthetic or natural rubber and any magnetic oxide having a grain size less than one micron will, when combined to form the medium, provide satisfactory magnetic recording properties. Iron oxide concentrations in the range of 40 per cent to 75 per cent by weight have been employed and have been found to provide satisfactory transmission properties. Satisfactory resiliency and recording head cushioning has been obtained with media having a thickness of not less than $\frac{1}{64}$ inch.

Satisfactory media have been produced by moulding, dipping and spraying. Moulding appears to offer the most economical and most easily controlled production process, while spraying of the medium directly onto the recording cylinder appears to produce slightly better transmission qualities. Spraying or dipping provides a coating on the cylinder which might be defined as permanent, while moulding provides a medium in the form of a replaceable belt or tire for the recording cylinder.

Figure 3:
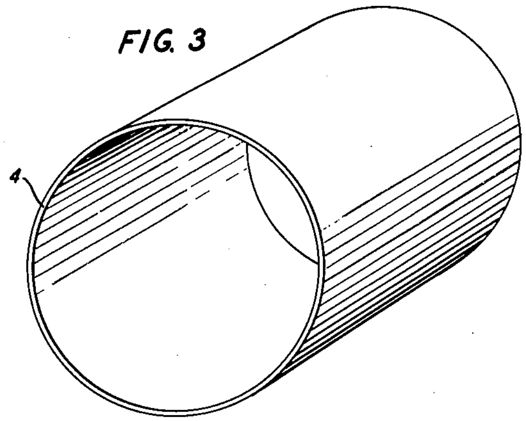
Fig. 3 is a perspective of the recording medium.

The medium in the form of a replaceable belt or tire is shown in Fig. 3.

It has been found that some advantages may be gained with regard to the quality of the medium surface upon which the recording head rides if a lubricant such as graphite, or wax, in concentrations up to 5 per cent by weight, is added to the composition of rubber and magnetic oxide prior to or during the milling operation.

A satisfactory composition, which may be taken as a specific example of the manner in which the invention may be practiced, was prepared by milling 100 parts of neoprene with 100 parts of magnetic iron oxide, 3 parts of paraffin wax, 4 parts of magnesium oxide and 5 parts of zinc oxide. This compound was then moulded and cured, and affixed to the recording cylinder in the form of an endless belt or tire.

It is to be understood that the above-described arrangements are illustrative of the application of the principles of the invention. Other arrangements may be devised by those skilled in the art without departing from the spirit and scope of the invention.

What is claimed is:

A sound record medium molded and cured into a flexible, collapsible, radially extensible endless band of substantially uniform thickness, consisting of 100 parts of neoprene intimately mixed with 100 parts of finely divided magnetic iron oxide, 3 parts of paraffin wax, 4 parts of magnesium oxide and 5 parts of zinc oxide, said record medium being mountable under radial tension and operable in intimate, continuous, yielding contact with an electromagnetic transducer.

References Cited in the file of this patent

UNITED STATES PATENTS

| | | |
|---|---|---|
| 96,237 | Johnson | Oct. 26, 1869 |
| 900,392 | Kirkegaard | Oct. 6, 1908 |
| 1,653,467 | O'Neill | Dec. 20, 1927 |
| 1,671,228 | Cherry | May 29, 1928 |
| 1,671,426 | Holland | May 29, 1928 |
| 1,731,483 | Fisher et al. | Oct. 15, 1929 |
| 1,847,860 | Best | Mar. 1, 1932 |
| 1,879,722 | Walton | Sept. 27, 1932 |
| 1,887,021 | Henderson | Nov. 8, 1932 |
| 1,994,534 | Robinson | Mar. 19, 1935 |
| 2,229,293 | Huntley et al. | Jan. 21, 1941 |
| 2,446,387 | Peterson | Aug. 3, 1948 |
| 2,496,047 | Goddard | Jan. 31, 1950 |

FOREIGN PATENTS

| | | |
|---|---|---|
| 340,705 | Great Britain | Jan. 8, 1931 |
| 418,096 | Great Britain | Oct. 18, 1934 |
| 459,884 | Great Britain | Jan. 18, 1937 |